United States Patent
Li et al.

(10) Patent No.: US 10,689,497 B2
(45) Date of Patent: Jun. 23, 2020

(54) ONE-STEP PROCESS FOR MAKING A POLYMER COMPOSITE COATING WITH HIGH BARRIER

(71) Applicant: AGENCY FOR SCIENCE, TECHNOLOGY AND RESEARCH, Singapore (SG)

(72) Inventors: Xu Li, Singapore (SG); Yu Yuan Chieng, Singapore (SG); Siew Yee Wong, Singapore (SG); Xikui Zhang, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 16/273,075

(22) Filed: Feb. 11, 2019

(65) Prior Publication Data

US 2019/0169389 A1 Jun. 6, 2019

Related U.S. Application Data

(62) Division of application No. 15/313,091, filed as application No. PCT/SG2015/050120 on May 21, 2015, now Pat. No. 10,233,297.

(30) Foreign Application Priority Data

May 21, 2014 (SG) .......................... 10201402527V

(51) Int. Cl.
| | |
|---|---|
| *C09D 133/08* | (2006.01) |
| *C08J 7/04* | (2020.01) |
| *C08F 20/06* | (2006.01) |
| *C08F 2/44* | (2006.01) |
| *C09D 4/06* | (2006.01) |
| *C09D 133/02* | (2006.01) |

(52) U.S. Cl.
CPC .............. *C08J 7/0427* (2020.01); *C08F 2/44* (2013.01); *C08F 20/06* (2013.01); *C09D 4/06* (2013.01); *C09D 133/02* (2013.01); *C08J 2429/04* (2013.01); *C08J 2433/02* (2013.01)

(58) Field of Classification Search
CPC .............................. C09D 133/08; C08K 3/346
See application file for complete search history.

(56) References Cited

U.S. PATENT DOCUMENTS

| | | | |
|---|---|---|---|
| 5,115,069 A | 5/1992 | Motegi et al. | |
| 6,759,463 B2* | 7/2004 | Lorah | B82Y 30/00 |
| | | | 524/186 |
| 7,303,797 B1 | 12/2007 | Barsotti et al. | |
| 10,233,297 B2 | 3/2019 | Li | |
| 2009/0047595 A1* | 2/2009 | McDougall | G03G 9/0804 |
| | | | 430/137.14 |
| 2014/0141262 A1 | 5/2014 | Castle et al. | |

FOREIGN PATENT DOCUMENTS

| | | | | |
|---|---|---|---|---|
| CN | 102206395 A | 10/2011 | | |
| CN | 102874825 A | 1/2013 | | |
| EP | 0 942 048 A1 | 9/1999 | | |
| WO | 2002/024756 A2 | 3/2002 | | |
| WO | WO-0224756 A2 * | 3/2002 | ............. | B82Y 30/00 |
| WO | 2006/055301 A2 | 5/2006 | | |
| WO | 2011/061510 A1 | 5/2011 | | |
| WO | WO-2011061510 A1 * | 5/2011 | ............. | C08J 7/047 |
| WO | 2011/123056 A1 | 10/2011 | | |
| WO | WO-2011123056 A1 * | 10/2011 | ............ | C08F 216/06 |
| WO | 2014/059415 A1 | 4/2014 | | |
| WO | 2015/020613 A1 | 2/2015 | | |

OTHER PUBLICATIONS

Oh et al., International Journal of Adhesion & Adhesives, vol. 47, 2013, 13-20.*
PCT Notification of Transmittal of the International Search Report and the Written Opinion of the International Searching Authority, or the Declaration for PCT Counterpart Application No. PCT/SG2015/050120, 26 pp., (Aug. 10, 2015).

(Continued)

*Primary Examiner* — Vu A Nguyen
(74) *Attorney, Agent, or Firm* — Womble Bond Dickinson (US) LLP

(57) ABSTRACT

This invention relates to a a one-step process for making a polymer composite suspension for coating plastic films characterized in that a first polymer is synthesized in-situ optionally in the presence of other polymers and in the presence of clay. Preferably the polymer composite suspension comprises a) 1.0 to 11.0 wt % of clay or silane modified clay, b) 0.1 to 10.0 wt % of poly (acrylic acid), which is a copolymer of acrylic acid (AA) with at least one other monomer selected from 2-ethylhexyl acrylate (EHA), β-carboxyethyl acrylate (β-CEA), methacrylamidoethyl ethylene urea (WAM II) and ethoxylated behenyl methacrylate (β-EM), c) 1.0 to 15.0 wt % of other polymers, preferably poly (vinyl alcohol) and d) 70 to 97 wt % of water or mixture of water with 2-propanol. The coating films made from the suspensions show good barrier capabilities against water vapor and oxygen can be used to make barrier layers on or within plastic films for packaging applications. The invention also relates to methods for making silane modified clay usable in the process for making the suspensions.

2 Claims, No Drawings

(56) References Cited

OTHER PUBLICATIONS

Jin-Kyoung Oh, et al., "Adhesion Performance of PSA—Clay Nano-Composites by the In-Situ Polymerization and Mechanical Blending", International Journal of Adhesion & Adhesives, vol. 47, pp. 13-20, (2013).

S. Pavlidou, et al., "A Review on Polymer—Layered Silicate Nanocomposites", Progress in Polymer Science, vol. 33, pp. 1119-1198, (2008).

Stephen Guggenheim, et al, "Definition of Clay and Clay Mineral: Joint Report of the AIPEA Nomenclature and CMS Nomenclature Committees", Clays and Clay Minerals, vol. 43, No. 2, pp. 255-256, (1995).

PCT International Preliminary Report on Patentability of the International PCT Counterpart Application No. PCT/SG2015/050120, dated Nov. 22, 2016; 13 pp.

* cited by examiner

ONE-STEP PROCESS FOR MAKING A POLYMER COMPOSITE COATING WITH HIGH BARRIER

Cross-Reference to Related Applications

This patent application is a divisional of U.S. Patent Application No. 15/313,091, filed Nov. 21, 2016, which is a U.S. National Phase Application under 35 U.S.C. § 371 of International Application No. PCT/SG2015/050120, filed May 21, 2015, entitled ONE-STEP PROCESS FOR MAKING A POLYMER COMPOSITE COATING WITH HIGH BARRIER, which claims priority to Singapore Patent Application No. 10201402527V, filed May 21, 2014.

TECHNICAL FIELD

The present invention generally relates to a process for making clay/polymer composites as a barrier layer for plastic films via a one-step process.

BACKGROUND ART

Plastic films such as Polyethylene terephthalate (PET), polypropylene (PP) and polyethylene (PE) are extensively used in packaging due to low cost, strength and stiffness, transparent and flexibility properties. In packaging, specifically for food packaging applications, a good barrier layer against oxygen and moisture is important to prolong the shelf life of packaged food. Oxygen and moisture that transmit from surrounding environment into the packaging will accelerate the oxidation and spoilage of food and encourage rapid mold growth during storage and transportation periods. Despite having a good mechanical strength and moldability properties, the barrier performance of commercially available plastic films in the market today is still relatively poor.

Polymer composites have been developed mainly to improve the mechanical properties and barrier performance of polymers to moisture and gases such as oxygen and carbon dioxide. Polymer composites are mixtures of polymers with inorganic or organic fillers with certain geometries. Inorganic fillers with a high aspect ratio such as nanoclay are particularly interesting because of their high specific surface area, availability, low cost, significant reinforcing effects and simple processability. According to Nielsen's theory (1967), the presence of nanoclay fillers in polymer matrix increases the tortuosity of the diffusive path for a penetrate molecule, thus providing an excellent barrier property. In recent years, many research works have been conducted on the modification of clay surfaces with organic compounds such as silanes with the aim to maximize the barrier performance by improving nanoclay compatibility with polymers. Besides the barrier performance, mechanical integrity of composite film and its bonding strength to plastic substrate are further factors affecting composite packaging performance.

The preparation methods and coating solutions for making composite films known from the prior art preferably make use of silane modified clay composites. However, the preparation methods for such modified clay are not satisfying. As known from the prior art, it is generally difficult to dissolve or disperse silanes in aqueous clay suspension because of their organophilic nature. To overcome this problem, previous approaches have used additives such as surfactants to form silane emulsions prior to the reaction with an aqueous clay suspension. The silane is first emulsified into water containing surfactant, which acts as a wetting agent and emulsifier. Then, the emulsified silanes are mixed with the clay silicates. Accordingly, the surfactant used in this case is limited to a specific range of hydrophilic/lipophilic balance valises. In addition, the surfactant concentration and pH at which the silane/surfactant emulsion is prepared are very important to the resulting silane emulsion stability. By using this method, it is very difficult to mix different types of silanes into one pot of aqueous clay suspension in a one-step process, because there a reaction may occur between the two silanes before reacting with clay silicates, which will result in reduced surface treatment of clay and bonding strength to the polymer matrix. Moreover, the presence of residual surfactants in the finished silane modified clay product may influence the properties of barrier layer even though its concentration is low. All these parameters limit the efficacy of the process and productivity in their preparation.

Another known method is directed to dissolving or dispersing silanes into aqueous clay suspension via a solvent exchange technique. In this method, the clay silicate aqueous suspension may be subjected to a solvent exchange whereby the solvent is capable of dissolving the silane compound. The solvent may be an organic solvent selected from methanol, ethanol, propanol, butanol, or pentanol or ketone, propanone or 2-butanone. The solvent exchange method involves washing and filtration steps. After silane-clay reaction, the solvent is removed and the silane modified clay is redispersed in aqueous solution. This modification process is cumbersome and may increase manufacturing cost. It further involves the use of organic solvent which makes it less environmentally acceptable.

In summary, it is found that the barrier films known from the prior art are not fully satisfying with regard to bonding strength to plastic films or do not show the desired high transparency. Others are very cumbersome to prepare and require the use of emulsifier/surfactant or organic solvent during the preparation.

Therefore, there is still a need to provide more cost effective, time saving and environmentally friendly methods to produce clay/polymer composite films with good oxygen and moisture barrier property combined with good bonding strength that overcome, or at least ameliorate, one or more of the disadvantages described above.

SUMMARY OF INVENTION

According to a first aspect, there is provided a one-step process for making a polymer composite suspension for coating plastic films characterized in that a poly (acrylic acid) (PAA) copolymer is synthesized in-situ optionally in the presence of other polymers and in the presence of clay. Advantageously, the invention provides a poly (acrylic acid) copolymer that can be synthesized by in-situ polymerization and shows improved barrier performance and bonding strength of the resulting polymer/clay composites on plastic films. The barrier layer of the present invention can be used for making barriers in plastic films with high transparency.

In one embodiment, the other polymers are selected from poly (vinyl alcohol). The suspension made by the process can comprise 1.0-10.0 wt % of clay, optionally 0.05-1.0 wt % of silanes, 0.1-10.0 wt % of poly (acrylic acid), 1.0-15.0 wt % of poly (vinyl alcohol) and 70-97 wt % of water or mixture of water with 25 wt % of 2-propanol. These compositions show a very high bonding strength and barrier properties.

In another embodiment the poly (acrylic acid) copolymer is a block copolymer synthesized from a mixture of acrylic monomers. A mixture of acrylic monomers comprising acrylic acid (AA), 2-ethylhexyl acrylate (EHA), β-carboxyethyl acrylate (β-CEA), methacrylamidoethyl ethylene urea (WAM II) and ethoxylated behenyl methacrylate (β-EM) is preferred. Advantageously, the variation of acrylic monomers and their content in the mixture allow the specific improvement of the suspensions. It was found that the β-CEA block, longer pendant carboxylic acid chains facilitate PAA/Clay and PAA/plastic bonding. It was further found that Ureido rings in WAM II block enhance PAA/Clay and PAA/plastic bonding strength. It was also found that the self-assembly of hydrophobic aliphatic chains from β-EM will enhance the moisture barrier of PVA/PAA/Clay composite coating.

In another embodiment the following sequence of steps is used: a) dissolving the other polymers, such as e.g. PVA, in water, b) adding the acrylic monomers under stirring, c) adding a dispersion of clay in water under high speed homogenisation, and d) starting a radical polymerisation in the presence of a starter and inert gas under elevated temperature to obtain a suspension. Advantageously, this in-situ polymerisation sequence is well suited to make the improved barrier layers.

Further embodiments relate to the use of radical starters selected from benzoyl peroxide, butyl hydro peroxide, azobisisobutyronitril or a combination of butyl hydro peroxide and isoascorbic acid in the polymerisation of the PAA copolymer and the use of silane modified clay. Advantageously, in the case of the use of silane modified clay, the clay sheets can be chemically coupled to the polymer matrix by silane coupling agents. In another embodiment the clay is modified with a blend of amino silanes and glycidoxy silanes. This mixture of silane coupling agents advantageously improves the clay dispersion into polymer. It may strengthen the bonding by providing crosslinking as the alkoxy reactive group of the silane binds to the clay silicate and the epoxy and amine reactive group may be made available for binding to the polymer in the polymer matrix. The addition of both aminosilanes and glycidoxy silanes is a method to further improve the bonding strength and adhesion to the polymer, thereby forming a strong composite layer.

According to a second aspect of the invention, there is provided the respective polymeric coating suspension obtainable according to the process of the invention.

According to a third aspect of the invention, there is provided a respective polymer composite coating suspension comprising a) 1.0 to 11.0 wt % of clay or silane modified clay,
b) 0.1 to 10.0 wt % of poly (acrylic acid) copolymer, which is a copolymer of acrylic acid (AA) with at least one other monomer selected from 2-ethylhexyl acrylate (EHA), β-carboxyethyl acrylate (β-CEA), methacrylamidoethyl ethylene urea (WAM II) and ethoxylated behenyl methacrylate (β-EM),
c) 1.0 to 15.0 wt % of other polymers and
d) 70 to 97 wt % of water or mixture of water with of 2-propanol.

These suspensions advantageously show good bonding to plastic films, high transparency and flexibility combined with high water vapour and oxygen protection when being coated on plastic films. In one embodiment the other polymers in this suspension are selected from poly (vinyl alcohol) and block copolymers of ethylene and vinyl alcohol.

According to a fourth aspect of the invention there is provided a method for making the silane modified clay by dispersing the clay in an aqueous solution and adding a silane or a mixture of silanes at a slow injection speed under high homogenization speed. Preferably the silane or silane mixture is added by injection with a flow rate of 0.1 to 3.0 ml/min and the speed of homogenization is in the range of 15,000 to 20,000 rpm of a turrax. Advantageously, this allows to uniformly intercalate silanes into clay sheet suspension in the high speed homogenization process. The silane is directly dispersed into aqueous clay suspension without using surfactants or organic solvent. With the present invention, it is feasible to prepare silane mixture modified clay product in a one-step process.

According to a fifth aspect, the invention relates to the use of silane modified clay obtained in a process for making a polymeric coating suspension for forming a barrier film on plastic films which comprises a polymer that has at least a hydroxyl functional group, a polymer that has a carboxyl functional group or mixtures thereof. Advantageously, the silane modified clay can be used in such a broad range of processes for making such polymer matrices including the in-situ polymerisation process mentioned above.

According to a sixth aspect, the invention relates to polymeric coating suspension obtained by using the silane modified clay made according to the above described method.

According to a seventh aspect of the invention, the polymeric coating suspensions made according to the various inventive processes and methods can be used for producing a laminated film on a plastic substrate. In one embodiment the use comprises the following steps: a) applying an inventive polymer composite suspension on a plastic film via blade coating, b) drying the obtained barrier layer on the plastic film, and c) coating the obtained bi-layer film with at least another plastic substrate with adhesive. The resulting three or more layer film obtained can be used for making packaging films. Advantageously, the packing films show the improved moisture and oxygen barrier capabilities.

DEFINITIONS

The following words and terms used herein shall have the meaning indicated:

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations or any two or more of said steps or features.

The term "clay" refers to both naturally occurring clay materials and to synthetic clay materials. Clay refers to phyllosilicate minerals and to minerals which impart plasticity and which harden upon drying or firing. See generally, Guggenheim, S. & Martin, R. T., "Definition of Clay and Clay Mineral: Joint Report of the AIPEA Nomenclature and CMS Nomenclature Committees," Clays and Clay Minerals 43:255-256 (1995). Materials composed of clay are characterized by having a mineral structure formed by the arrangement of octahedral units and tetrahedral units or by stacked layers formed by an octahedral sheet and one or more tetrahedral sheets of the atoms that constitute the clay structure. Illustrations are the two groups of naturally occurring clay minerals. First is the hormite group, defined here as including palygorskite and sepiolite, which have channels formed by octahedral units and tetrahedral units of the clay mineral structure. Second is the smectite group including montmorillonites and saponite, which are constituted by stacked layers formed by an octahedral sheet and more than one tetrahedral sheet, and mixtures of the foregoing. Smectite is a generic term that refers to a variety of related minerals also found in some clay deposits. Smectite is composed of units made of two silica tetrahedral sheets with a central alumina octahedral sheet. Each of the tetrahedra has a tip that points to the center of the smectite unit. The tetrahedral and octahedral sheets are combined so that the tips of the tetrahedra of each silica sheet and one of the hydroxyl layers of the octahedral sheet form a common layer. In particular, the smectite family of clay minerals includes the various mineral species montmorillonite, beidellite. nontronite, hectorite and saponite, all of which can be present in the clay mineral in varying amounts.

The term "synthetic clay" is to be interpreted broadly to include materials related in structure to layered clays and porous fibrous clays such as synthetic hectorite (lithium magnesium sodium silicate). The term "synthetic clay" may include materials that have the same chemical formula and structure as natural clays.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1 % of the stated value, and even more typically +/−0.5% of the stated value.

Percentages in a composition refer to weight percentages unless stated otherwise.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and genetically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED Description

Non-limiting embodiments of the invention will be further described in greater detail by reference to specific examples, which should not be construed as in any way limiting the scope of the invention.

According to a first aspect, there is provided a one-step process for making a polymer composite suspension for coating plastic films characterized in that a poly (acrylic acid) (PAA) copolymer is synthesized in-situ optionally in the presence of other polymers and in the presence of clay.

The final polymer composite suspension may be a gelatinous suspension of clay/polymer(s), wherein the clay is present in the gelatinous suspension. The term "gelatinous suspension" is to be interpreted broadly to refer to a liquid composition whereby one of the constituents in the liquid composition is present in a particulate semisolid form in the suspension.

The clay silicates may be selected from the group consisting of montmorillonite, bentonite, laponite, kaolinite, saponite, vermiculite and mixtures thereof. The clay may be natural clay, synthetic clay or silane or silane mixture modified clay. In a preferred embodiment, the clay is montmorillonite. The clay preferably has a sheet-type or plate-like structure and a high aspect ratio. The clay sheets are only a few nanometers, sometimes only about 1 nm, thick (nanoclay).

The clay content in the polymer composite suspension is preferably between 1 wt % and 10 wt %, between 1 wt % and 8 wt %, between 1 wt % and 6 wt %, between 1 wt % and 5 wt %, between 1 wt % and 3 wt %, between 1 wt % and 2 wt %, between 2 wt % and 10 wt %, between 3 wt % and 10 wt %, between 5 wt % and 10 wt %, between 8 wt % and 10 wt %.

In one embodiment the clay is a silane modified clay. In the embodiment of silane modified clay, clay may be chemically coupled to the polymer matrix by a silane coupling agent or mixtures thereof with other silanes. The silane content in the suspensions is then between 0.05 and 1.0 wt %, preferably 0.05 to 0.7 wt %, most preferably 0.05 to 0.2 wt %. Preferred are silanes with a glycidoxy group for coupling. In embodiments where coupling compound is glycidoxy silane, the glycidoxy silane compound may be a glycidoxyalkylalkoxysilane compound or a glycidoxyalkylsilane compound. The glycidoxyalkylalkoxysilane compound may be selected from the group consisting of glycidoxymecthyltrimethoxysilane, glycidoxymethyltricthoxysilane, glycidoxymethyltripropoxysilane, glycidoxyethyltrimethoxysilane, glycidoxyethyltriethoxysilane, glycidoxyethyltripropoxysilane, glycidoxypropyltrimethoxysilane, glycidoxypropyltriethoxysilane, glycidoxypropyltripropoxysilane, glycidoxypropyltri (methoxyethoxy) silane, glycidoxypropylmethyldimethoxysilane, glycidoxypropylmethyldiethoxysilane, glycidoxypropylmethyldiethoxysilane, glycidoxypropylmethyldibutoxysilane, glycidoxypropylmethyldiisopropenoxysilane, glycidoxypropyldimethylethoxysilane, glycidoxypropyldimethylmethoxysilane, glycidoxypropyldimethylpropoxysilane, lycidoxypropylmethyldiisopropenoxysilane, glycidoxypropyldiisopropylethoxysilane, glycidoxypropylbis (trimethylsiloxy) methylsilane, glycidoxybutyitrimethoxysilane, hydrolyzates thereof, and mixtures thereof. The glycidoxyalkylsilane compound may be at least one of glycidoxypropyltrimethylsilane and glycidoxypropylpentamethyldisiloxane. Additional exemplary glycidoxysilane compounds may be obtained from U.S. Pat. No. 5,115,069.

The silane can be applied at a weight ratio of 1 to 30 %, preferably 2 to 20%, most preferably 3 to 17% by weight relative to the clay.

The coupling agent may also be an aminosilane, such as an (aminoalkyl)trimethoxy silane coupling agent or mixtures thereof with other silanes. Most preferably silane coupling agent may be (3-glycidoxypropyl)trimethoxysilane, (3-aminopropyl)trimethoxysilane and mixtures thereof. A mixture of (3-aminopropyl)trimethoxysilane and (3-glycidoxypropyl)trimethoxysilane at a concentration ratio of about 1:5 to 4:5 and more preferably at a concentration ratio of about 2:3 may be particularly mentioned as preferred to achieve a good bonding strength.

In one embodiment, clay is dispersed in aqueous solution. It is preferable to add a small volume of acetic acid to promote exfoliation of clay sheets in the suspension.

The amount of clay in the final barrier layer after coating a plastic film with the suspension and drying may be in the range selected from the group consisting of between 20 wt % and 80 wt %, between 25 wt % and 80 wt %, between 30 wt % and 80 wt %, between 40 wt % and 80 wt %, between 50 wt % and 80 wt %, between 55 wt % and 80 wt %, between 60 wt % and 80 wt %, between 70 wt % and 80 wt %, between 20 wt % and 30 wt %, between 20 wt % and 35 wt %, between 20 wt % and 40 wt %, between 20 wt % and 45 wt %, between 20 wt % and 50 wt %, between 20 wt % and 55 wt %, between 20 wt % and 60 wt %, between 20 wt % and 65 wt %, and between 20 t % and 70 wt %, based on the weight of the polymer matrix. In other embodiments the amount of clay in the barrier layer made from the polymer composite suspension is in the range of 20 to 80 wt % based on the weight of polymer matrix, more preferably in the range of 20 to 60 wt %, and particular preferably in the range of 20 to 40 wt %. The homogeneous dispersion of high concentration clay sheets that are well-oriented along the polymer matrix does not affect the optical properties of the barrier layer.

Poly(acrylic acid) (hereinafter also PAA) includes in its meaning all synthetic high molecular weight polymers of acrylic acid. According to the invention it can be a block copolymer of various acrylic monomers. The PAA content in the polymer composite suspension is preferably between 0.1 wt % and 10 wt %, between 0.1 wt % and 4 wt %, between 0.1 wt % and 2 wt %, between 0.1 wt % and 1 wt %, between 0.5 wt % and 2 wt %, between 0.5 wt % and 7 wt %, between 0.5 wt % and 5 wt %, between 0.5 wt % and 4 wt %, between 0.5 and 1, between 1 wt % and 4 wt %. The PAA preferably has a Molecular weight (MW) of 200,000-600,000 g/mol, more preferably 400,000-500,000 g/mol, most preferably 450,000 g/mol.

Optionally the PAA polymer matrix may comprise other polymers or a plurality of other polymers that may be capable of cross-linking with each other to form the polymer matrix. Preferably, the polymer (s) making up the polymer matrix may have at least a hydroxyl functional group, a carboxyl functional group and/or an amine functional group. The hydroxyl group and carboxyl group may be disposed on the ends of a polymer chain, or on the side-chains of the backbone of a polymer chain. In addition, this polymer may include an amine functional group. In another embodiment where a plurality of polymers is used, each polymer may have the hydroxyl functional group, the carboxyl functional group or the amine functional group.

In the embodiment where the hydroxyl group and carboxyl group are on the same polymer chain as end groups or on the side-chains of the backbone of a polymer chain, this polymer may be selected from the group consisting of vinyl alcohol-acrylic acid copolymer and vinyl alcohol-methacrylic acid copolymer.

When other polymers are used together with the PAA, the polymer having a hydroxyl functional group may be selected from the group consisting of polyvinyl alcohol polymer, polyvinyl alcohol derivatives, polyvinyl alcohol copolymers, starch, starch derivatives, chitosan, chitosan derivatives, cellulose, cellulose derivatives such as cellulose ether and ester derivatives, gums, arabinans, galactans, galactomannans, proteins, various other polysaccharides and mixtures thereof. The polymer having a carboxyl functional group may be a polycarboxylic acid. The polymer having an amine functional group may be selected from the group consisting of alkylated polyallylamine, polyvinylamine, poly (diallylamine) and poly (ethyleneimine), optionally substituted at one or more nitrogen atoms with an alkyl group or a substituted alkyl group such as a trialkylammonioalkyl group.

As at least one of the other polymers used according to the first aspect of the invention poly (vinyl alcohol) (hereinafter also PVA) is preferred. The polyvinyl alcohol polymer comprises mainly monomer units of vinyl alcohol. The polyvinyl alcohol copolymer may poly (ethylene-co-vinyl alcohol) (EVOH) of varying vinyl alcohol content. PVA can be a water-soluble synthetic polymer. It has then the idealized formula $[CH_2CH(OH)]_n$. The PVA preferably has a molecular weight (MW) of 1,000 to 100,000, more preferably 20,000 to 60,000, most preferably 40,000 to 50,000.

The PVA content in the polymer composite suspension is preferably between 1 wt % and 15 wt %, between 1 wt % and 12 wt %, between 1 wt % and 10 wt %, between 1 wt % and 7 wt %, between 1 wt % and 5 wt %, between 4 wt % and 8 wt %, between 3 wt % and 9 wt %, between 2 wt % and 8 wt %, between 2 wt % and 15 wt %, between 5 wt % and 15 wt %, between 8 wt % and 15 wt %, between 10 wt % and 15 wt %, between 12 wt % and 15wt %.

Preferably the PAA copolymer is the result of a polymerisation of various acrylic monomers or monomer blocks comprising acrylic acid, 2-ethylhexyl acrylate, β-carboxyethyl acrylate, methacrylamidoethyl ethylene urea and ethoxylated behenyl methacrylate. The weight percentage of various blocks in the polymer preferably comprise 50 to 90 wt %, more preferably 55 to 80 wt %, most preferably 60 to 70 wt % of acrylic acid. The monomer mixture preferably comprises 5 to 30 wt %, more preferably 5 to 25 wt %, most preferably 10 to 20 wt % of 2-ethylhexyl aery late. The monomer mixture preferably comprises 0.5 to 10 wt %, more preferably 1 to 7 wt %, most preferably 3 to 5 wt % of β-carboxyethyl acrylate. The monomer mixture preferably comprises 0.5 to 10 wt %, more preferably 1 to 7 wt %, most preferably 3 to 5 wt % of methacrylamidoethyl ethylene urea. The monomer mixture preferably comprises 0.5 to 10 wt %, more preferably 1 to 7 wt %, most preferably 3 to 5 wt % of ethoxylated behenyl methacrylate.

The PAA co-polymer is novel and also part of the invention.

If PVA is used as another polymer, the PVA to PAA ratio is preferably about 10:1 to 1:10, more preferably 8:1 to 1:1, most preferably 5:1 to 2:1.

The polymer composite suspension made according to the inventive process preferably comprises between 70 wt % and 97 wt %, between 90 to 97 wt % or between 92 and 96 wt % of water or a water or a mixture of water with 2-propanol. Deionized water or deionized water in admixture of 25 wt % of 2-propanol may be especially mentioned.

The suspension made by the process can therefore comprise 1.0 to 10.0 wt % of clay, optionally 0.05 to 1.0 wt % of silanes, 0.1 to 10.0 wt % of poly (acrylic acid), 1.0 to 15.0 wt % of poly (vinyl alcohol) and 88 to 97 wt % of water or mixture of water with 25 wt % of 2-propanol.

Another composition to be mentioned is one that comprises 1.0 to 10.0 wt % of clay, 0.05-1.0 wt % of silanes, 0.1-10.0 wt % of poly(acrylic acid), 1.0-15.0 wt % of poly(vinyl alcohol), 70-97 wt % of deionised water or mixture with 25 wt % of 2-propanol.

According to a second aspect of the invention, there is provided the respective polymeric coating suspension obtainable according to the process of the invention.

An especially preferred suspension according to the invention comprises a) 1.0-11.0 wt % of clay or silane modified clay, b) 0.1-10.0 wt % of poly (acrylic acid), which is a copolymer of acrylic acid (AA) with at least one other monomer selected from 2-ethylhexyl acrylate (EHA), β-carboxyethyl acrylate (β-CEA), methacrylamidoethyl ethylene urea (WAM II) and ethoxylated behenyl methacrylate (β-EM), c) 1.0-15.0 wt % of other polymers and d) 88-97 wt % of water or mixture of water with of 2-propanol.

The components of a) to d) may add up to 100% of the suspension. This polymer composite coating solution suspension is novel and also part of the invention.

Component c) can preferably be selected from poly (vinyl alcohol). A composition is preferred which contains all of the acrylic monomers selected from 2-ethylhexyl acrylate (EHA), β-carboxyethyl acrylate (β-CEA), methacrylamidoethyl ethylene urea (WAM II) and ethoxylated behenyl methacrylate (β-EM).

As mentioned above, the monomer mixture of all monomers or block monomers preferably comprises 50 to 90 wt %, more preferably 55 to 80 wt %, most preferably 60 to 70 wt % of acrylic acid. The monomer mixture preferably comprises 5 to 30 wt %, more preferably 5 to 20 wt %, most preferably 10 to 20 wt % of 2-ethylhexyl acrylate. The monomer mixture preferably comprises 0.5 to 10 wt %, more preferably 1 to 7 wt %, most preferably 3 to 5 wt % of β-carboxyethyl acrylate. The monomer mixture preferably comprises 0.5 to 10 wt %, more preferably 1 to 7 wt %, most preferably 3 to 5 wt % of methacrylamidoethyl ethylene urea. The monomer mixture preferably comprises 0.5 to 10 wt %, more preferably 1 to 7 wt %, most preferably 3 to 5 wt % of ethoxylated behenyl methacrylate. The monomers and block monomers above may add up to 100 wt %.

Other components and preferred use ratios have been also discussed above with regard to the suspension of the one-step process according to the first aspect of the invention.

The suspension obtained is stable and can be stored for longer periods of time, such, as more than 180 days.

Preferably the process comprises the following steps:

a) optionally dissolving the other polymers in water b) adding the acrylic monomers or monomer blocks of the poly (acrylic acid) copolymer into water or into the aqueous polymer solution under stirring, c) adding a dispersion of clay in water, d) starting a radical polymerisation in the presence of a starter and inert gas under elevated temperature to obtain a suspension.

In step a) PVA or its mixtures with other polymers is preferred as the polymer to be dissolved in water. Preferably this is done at elevated temperatures of about 60 to 95° C. and under stirring. Step a) can be optional, if no other polymers are used in addition to PAA.

In step b) the components are mixed into the aqueous solution. Preferably the monomers comprise a mixture of acrylic acid, 2-ethylhexyl acrylate, β-carboxyethyl acrylate, methacrylamidoethyl ethylene urea and ethoxylated behenyl methacrylate. Then, preferably the 2-ethylhexyl acrylate is added first and separately.

In step c) the addition of clay suspension in water is preferably done under or followed by a homogenization. In the clay/water dispersion acetic acid can be used for exfoliating the clay sheets.

Step d) is a radical polymerisation. The radical polymerisation is preferably performed at elevated temperature of about 50 to 95° C. in the presence of a radical starter. The radical starter can be any suitable starter for radical polymerisation of the monomers to form PAA copolymer. As such starters there can be mentioned peroxide and azo compounds, such as for example benzoyl peroxide (BPO), butyl hydro peroxide (BHPO), azobisisobutyronitril (AIBN) or a combination of butyl hydro peroxide and isoascorbic acid. The polymerization is initiated by heating the monomer suspension to the elevated temperature in the presence of inert gas, such as nitrogen. In the suspension polymerization, PVA works as emulsifier to encapsulate acrylate monomer and clay works as emulsion aider to stabilize acrylate monomer suspension. Step d) can be run in an emulsion to form the final suspension.

Steps a) to d) can be run without separation steps ("one pot process").

In another aspect of the invention there has been provided a method for making silane modified clay that can be preferably used in the inventive process for making the coating suspensions. A method is provided for making silane modified clay by dispersing the clay in an aqueous solution and adding a silane or a mixture of silanes at a slow injection speed under high homogenization speed.

The dispersion of clay into water can be preferably done by stirring over several hours, preferably 3 to 8 hours and can be supported by ultrasonication. For exfoliation acetic acid can further be added in the clay/water dispersion after the first stirring and/or ultrasonication. After addition of the acetic acid the dispersion is preferably stirred again for several hours, preferably 6 to 24 hours to obtain an optimal starting material for silane modification.

In one embodiment of this method, the silane is then introduced to the dispersed clay suspension via slow flow rate injection technique, while the clay suspension is continuously mixed under high speed during homogenization process. Preferably the flow rate of the injection of the silane is between 0.1 to 3.0 ml/min, more preferably at 0.1 to 1.0 ml/min, and particularly preferably at 0.1 to 0.5 ml/min. The injection can for example be made to a specified volume in a 300 ml to 1 l round bottom flask. The homogenization speed is preferably in the range of 10,000-20,000 rpm, preferably 15,000 to 20,000 rpm of a suitable disperses A typical lab disperser, such as an IKA® T 18 digital ULTRA-TURRAX®, can be used with an adequate high speed setting. For example, in case of a combined (3-aminopropyl)trimethoxysilane and (3-glycidoxypropyl)trimethoxysilane use, (3-aminopropyl)trimethoxysilane is first slowly injected into the clay suspension, followed by slow injection of (3-glycidoxypropyl)trimethoxysilane. In one embodiment, the clay suspension is continuously mixed under high speed during the homogenization process while both injections are carried out. The silane modified clay suspension is then allowed to further homogenize for a sufficient time, preferably of about 5 to 30 min, more preferably about 15 minutes, for the silane or silanes to bind to the surfaces of the silicate sheets.

The method according to the invention for making the silane modified clay comprises preferably a heating step after the injection of the silane. In this heating step, an elevated temperature is applied. Typical temperatures are for instance about 80° C. or less, or about 40 to 75° C. In an embodiment, an aqueous silanes modified clay suspension may be heated at about 50 to 70° C. for about 3 to 8 hours, preferably 3 to 6hours, under stirring.

The silane modified clay obtained according to the method can be directly used in a process for making a polymeric coating suspension for forming a barrier film on plastic films which comprises a polymer that has at least a hydroxyl functional group, a polymer that has a carboxyl functional group or mixtures thereof. In an embodiment, the polymer having a hydroxyl functional group may be selected from the group consisting of polyvinyl alcohol polymer and its derivatives. The polymer having a carboxyl functional group may be selected from the group consisting of polycarboxylic acid and its derivatives such as polyacrylic acid polymer. The polymer matrix is preferably a mixture thereof for an optimum reinforcement. The amount of polymer in the barrier layer may be in the range of 20 to 80 wt %, based on the weight of clay, more preferably in the range of 50 to 70 wt %.

The silane modified clay obtained according to method can also be directly used in the one-step process according to the first aspect of the invention.

The polymer composite suspensions obtained in the one-step process according to the first aspect of the invention or the silane modified clay obtained by the above described method can be used for producing a laminated film on a plastic film.

A process for the preparation of polymer composites water-based coating suspensions of the invention may comprises the steps of a ) preparing of a silane modified clay or a silane blend modified clay b) homogeneously mixing with water soluble polymer solutions c) coating on a plastic film. Thereby a barrier layer is formed.

All the polymer composite coating suspensions described above can be further used for producing a laminated film comprising said polymer composite suspensions together with an adhesive.

The plastic film which is coated or laminated with the suspension can for instance be a polyethylene terephthalate, biaxially oriented polypropylene or polyethylene film, coated with about 5 to 50 μm of said polymer composites coating solution. The final concentration of barrier layer may be in the range of about 1 to 10 wt %, more preferably in the range of about 3 to 8 wt %, and particularly preferably of about 5 to 7 wt % of the overall coated film. In one embodiment, the final concentration of the barrier layer from the polymer composite suspension is about 7 wt %. After drying, the coated harrier layer will be about 0.25 to 3.5 μm in thickness. The concentration of clay/polymer may be calculated by measuring the weight change, of a part of the composites suspension before and after complete drying. The silanes modified polymer composite suspension can be applied onto plastic film via blade coating using a film applicator to form a composites layer thereon.

A bilayer structure of (silane modified clay/polymer composite)/plastic can be obtained. The clay sheets are homogeneously dispersed in the said composites and aligned along the substrate plane by employing the shearing force during the application. The applied said composites layer on the plastic substrate is then dried by air flash at room temperature, and the heating step is more preferably followed by vacuum drying at about 60° C. or hot air drying.

Step e) can comprise the following steps: applying the polymer composite suspension on a plastic film via blade coating, drying the obtained barrier layer on the plastic film, and coating the obtained bi-layer film with at least another plastic substrate with adhesive.

At least another layer of plastic substrate is then coated with adhesive as binder to improve the adhesion between two films. The applied said adhesive/plastic bilayer is dried by air flash at room temperature. In one embodiment, the heating step is undertaken when the said (silanes modified clay/polymer composite)/plastic bilayer film is compressed together with said adhesive/plastic to form a plastic/(silane modified clay/polymer composites)/plastic trilayer film which can be covered by additional layers. The temperature used during the heating step may be in the range of about 100 to 140° C. depending on the plastic substrate used. In one embodiment, the temperature applied is about 130° C. for a polyethylene terephthalate substrate. The heating step may he a laminating step. It is preferable to apply pressure during the lamination process.

The laminated plastic/(silanes modified clay/polymer composites)/plastic trilayer film allows light to pass through the film. The tri or more layer film obtained has use for making packaging films.

The transparency of the film can be influenced by the concentration of composites and the thickness of the barrier layer. Process optimization to produce a thin barrier layer with a thickness of less than 5 μm, preferably a thickness which is below 1 μm is desirable for uses in packaging to fulfil the requirements of low material usage and low film thickness combined with excellent transparency.

EXAMPLES

Non-limiting examples of the invention and a comparative example will be further described in greater detail by reference to specific Examples, which should not be construed as in any way limiting the scope of the invention.

Materials and Methods

In the examples described below, unless otherwise indicated, all temperatures in the following description are in degrees Celsius and all parts and percentages are by weight, unless indicated otherwise. Reagents useful for synthesizing compounds may be purchased from commercial suppliers as mentioned in the examples.

Test Methods Used

Oxygen Transmission Rate (OTR)

Oxygen permeability of nanocomposites coated PET film was measured by using Mocon oxygen permeability OX-TRAN Model 2/21 according to ASTM D3985standard. Each film was placed on a stainless steel mask with an open testing area of 5 $cm^2$. Oxygen permeability measurements were conducted at 23° C. (1 atm) and 0% relative humidity by placing coated surface of films to the oxygen rich side.

Water Vapor Transmission Rate (WVTR)

Water vapor permeability of nanocomposites coated PET film was measured by using Mocon water vapor permeability PERMATRAN-W Model 3/33 according to ASTM F1249 standard. Each film was placed on a stainless steel mask with an open testing area of 5 $cm^2$. Water vapor permeability measurements were conducted at 37.8° C. (1 atm) and 90% relative humidity by placing coated surface of films to the water vapor rich side.

Example 1

Preparation of Silanes Modified Clay Suspension (SMMT[1])

5.0 g of pristine clay (montmorillonite) obtained from Nanocor Inc. of Arlington Heights of Ill. of the United States of America was mixed with 125 ml deionised water and stirred for 6 hours, followed by ultrasonication in a water-bath for 30 minutes. Then, 0.1875 ml of acetic acid was added to the solution and stirred for another 12 hours. To exchange water with acetone, acetone was added to the suspension. The clay suspension was homogenized with acetone using an IKA T18 Basic Ultra Turrax homogenizer at 15,000 rpm for 5 minutes. Thereafter, the slurry precipitate was filtered with a Buchner funnel and washed with acetone. The collected slurry precipitate was re-suspended into 500 ml of acetone and homogenized for 5 minutes at 15,000 rpm, followed by filtration and washing. Each cycle should use at least 500 ml of acetone. After second cycle, the collected precipitate was transferred to a round bottom flask, and then topped up with appropriate amount of acetone, 0.1 g of (3-aminopropyl)trimethoxysilane (97%, Aldrich) and 0.15 g of (3-glycidoxypropyl)trimethoxysilane ($^3$ 98%, Aldrich) were added to the solution. After stirring for 8 hours at room temperature, the mixture was ultrasonicated for 30 minutes and stirred at 50° C. for 8 hours. Then, 125 ml of deionized water was added into clay-acetone-silanes mixture and all the acetone was then removed by rotary evaporation at 60° C.

Example 2

Preparation of Silanes Modified Clay Suspension (SMMT[2])

5.0 g of pristine clay (montmorillonite) obtained from Nanocor Inc. of Arlington Heights of Illinois of the United States of America was mixed with 125 ml deionised water and stirred for 6 hours, followed by ultrasonication in a water-bath for 30 minutes. Then, 0.1875 ml of acetic acid was added to the solution and stirred for another 12 hours. After that, 0.1 g of (3-aminopropyl)trimethoxysilane (97%, Aldrich) was first slowly injected (0.1 ml/min) into the clay suspension, followed by 0.15 g of (3-glycidoxypropyl) trimethoxysilane ($^3$ 98%, Aldrich) under high speed of homogenizing process at 15,000 rpm by using an IKA T18 Basic Ultra Turrax for 15 minutes. Then, silanes modified clay suspension was heated at 50° C. for 6 hours under stirring.

Example 3

Preparation of Silanes Modified Clay Suspension (SMMT[3])

5.0 g of pristine clay (montmorillonite) obtained from Nanocor Inc. of Arlington Heights of Illinois of the United States of America was mixed with 125 ml deionised water and stirred for 6 hours, followed by ultrasonication in a water-bath for 30 minutes. Then, 0.1875 ml of acetic acid was added to the solution and stirred for another 12 hours. After that, 0.2 g of (3-aminopropyl)trimethoxysilane (97%, Aldrich) was first slowly injected (0.1 ml/min) into the clay suspension, followed by 0.3 g of (3-glycidoxypropyl) trimethoxysilane ($^3$ 98%, Aldrich) under high speed of homogenizing process at 15,000 rpm by using an IKA T18 Basic Ultra Turrax for 15 minutes. Then, silanes modified clay suspension was heated at 50° C. for 6 hours under stirring.

Example 4

Preparation of Silanes Modified Clay Suspension (SMMT[4])

5.0 g of pristine clay (montmorillonite) obtained from Nanocor Inc. of Arlington Heights of Illinois of the United States of America was mixed with 125 ml deionised water and stirred for 6 hours, followed by ultrasonication in a water-bath for 30 minutes. Then, 0.1875 ml of acetic acid was added to the solution and stirred for another 12 hours. After that, 0.3 g of (3-aminopropyl)trimethoxysilane (97%, Aldrich) was first slowly injected (0.1 ml/min) into the clay suspension, followed by 0.45 g of (3-glycidoxypropyl) trimethoxysilane ($^3$ 98%, Aldrich) under high speed of homogenizing process at 15,000 rpm by using an IKA T18 Basic Ultra Turrax for 15 minutes. Then, silanes modified clay suspension was heated at 50° C. for 6 hours under stirring.

Example 5

Preparation of Silanes Modified Clay Suspension (SMMT[5]-SMMT[7])

The preparation method is analogous to SMMT[2], except varying the clay to polymer ratio (wt %) and final total solid content concentrations. The composites solution can be diluted with water or mixture of water (75%) and 2-propanol (25%).

Example 6

Preparation of Poly(Vinyl Alcohol) (PVA) Solution 9.76 g of PVA (MW 44,000 completely hydrolyzed obtained from Wako Pure Chemical Industries, Ltd., Japan) was dissolved in 90 ml of deionized water under stirring at 100° C.

Example 7

Preparation of Poly(Acrylic Acid) (PAA) Solution 1.91 g of PAA (MW 450,000 obtained from Polysciences Asia Pacific, Inc., Taiwan) was dissolved in 23.14 ml of deionized water under stirring at room temperature (about 25° C.).

Example 8

Preparation of SMMT[2]/Polymer Nanocomposites

First, PAA solution obtained from Preparation Example 7 was added into silanes modified clay suspension obtained from Preparation Example 2 under high speed homogenization process at 15,000 rpm for 5 minutes by using an IKA T18 Basic Ultra Turrax. Then, followed by addition of PVA solution obtained from Preparation Example 6 under same conditions. After addition, the mixture was continuously homogenized for 15 minutes at 15,000 rpm. For samples with isopropanol, 25% (v/v) of isopropanol to water may be added into the solution and homogenized for another 5 minutes.

Example 9

Preparation of Silanes Modified Clay/Polymer Nanocomposites Film

SMMT[1]-SMMT[7]/Polymer coating solutions obtained from Preparation Example 1-5 were blade coated onto a PET film by using a film applicator with an applicator bar coating gap controlled at 50 μm. The applied nanocomposites layer was then dried by air flash at room temperature for 24 hours, followed by drying in a vacuum oven at 60° C. for 24 hours. For laminated films, another plastic film is coated with adhesive. Both of the coated plastic films were compressed together by using a laminator at 130° C.

Example 10

Synthesis of PVA/PAA/Clay Composite Suspension via in situ Polymerization

PVA solution is prepared by dissolving 18.4 g PVA into 200 g water at 90° C. under stirring. Clay water suspension is prepared by dispersing 9.4 g into 200 g water under stirring followed by adding 0.3 ml acetic acid and further homogenizing for 30 minutes.

109.7 g of the above prepared PVA solution and 0.5 g EHA (Solvay Singapore Pte Ltd) are added in a 500 ml round bottom flask, and the mixture is stirred for 5 minutes. Then 0.1 g P CEA (Solvay Singapore Pte Ltd), 0.1 g WAM II (Solvay Singapore Pte Ltd), 0.1 g p EM (Solvay Singapore Pte Ltd) and 1.7 g AA (Solvay Singapore Pte Ltd) are mixed into the PVA solution. 104.7 g clay suspension and 100 g water are added into the round bottom flask and homogenized for 5 minutes. After inletting $N_2$ for 30 minutes, the mixture is heated up to 60° C. under stirring. Finally, 0.05 ml BHPO and 0.5 ml Isoascorbic acid (5 wt % in water) are injected into the mixture, respectively, and stirred at 60° C. overnight. The total solid concentration of the prepared PVA/ PAA/Clay composite suspension is 4.4 wt %.

OTR and WVTR of PET film coated with the above prepared PVA/PAA/Clay composite suspension are measured as 0.46 cc/m²·day and 19.2 g/m²·day, respectively: OTR and WVTR of PP film coated with the above prepared PVA/PAA/Clay composite suspension are measured as 1.3 cc/m²·day and 4.4 g/m²·day, respectively.

Results

Table 1 showed the transmission rate of oxygen and water vapor for plastic films with or without composites coating. Oxygen transmission rate was measured at 23° C. and 0% relative humidity, and water vapor transmission rate was measured at 37.8° C. at a 90% relative humidity for a number of test films. The thickness of the composites layer is controlled in a range of about 0.3 to 3.5 μm, which is dependent on the final total solid content concentration. Meanwhile, the thickness of a PET plastic film is about 12 μm. As revealed in Table 1, the oxygen transmission rates of composites layer coated PET films were significantly reduced in comparison to that of pure PET film. In the present invention, the lowest OTR of the composites/plastic film was achieved at 0.19 cc/(m2·day ), which in overall is 99.7 to 99.9% of reduction as compared to pure PET film. On the other hand, the water vapor transmission rates of composites layer coated plastic films were reduced to about 49.3 to 72.4% in comparison to that of pure PET film. In addition, the barrier property of composites layer prepared from present invention (SMMT [1] Polymer) is comparable or even better than the composites layer prepared by solvent exchange method (SMMT[2] Polymer) from prior art. Moreover, it is important to high-light that the coated layers as prepared by one-step process in this invention has a high bonding strength of >>170 g/15 mm (standard requirement of bonding strength for pack-aging film). Despite having good barrier property and high bonding strength, in situ polymerization and direct dispersion of silanes into aqueous clay suspension in one-step process according to embodiments described herein have many advantages, cost effective, time saving and more environmental friendly.

TABLE 1

Oxygen and Water Vapor Transmission Rates of Films

| Type of Film* | Silanes to dry clay (wt %) | Solid content (wt %) | Clay/polymer ratio (wt %) | OTR (cc/[m². day]) | WVTR (gm/[m² · day]) |
|---|---|---|---|---|---|
| PET | — | — | — | 130.65 | 46.49 |
| SMMT[1]_Polymer/PET | 5 | 7 | 30/70 | 0.33 | 15.02 |
| SMMT[2]_Polymer/PET | 5 | 7 | 30/70 | 0.30 | 12.89 |
| SMMT[3]_Polymer/PET | 10 | 7 | 30/70 | 0.24 | 12.85 |
| SMMT[4]_Polymer/PET | 15 | 5 | 30/70 | 0.19 | 14.43 |
| SMMT[5]_Polymer/PET | 5 | 5 | 30/70 | 0.28 | 14.85 |
| SMMT[6]_Polymer/PET | 5 | 4 | 50/50 | 0.31 | 17.50 |
| SMMT[7]_Polymer/PET | 5 | 4 | 75/25 | 0.22 | 23.55 |

*Thickness of the composite layer was controlled at about 2.5-3.5 μm

INDUSTRIAL APPLICABILITY

The one-step process for making polymer composite suspensions may find a multiple number of applications in the manufacturing of barrier films for plastic films of packaging. For example, the methods as defined above may be used to manufacture packaging films with good barrier property. A good barrier layer against oxygen and moisture is important to protect the produces packaged from fast oxidation and deterioration. With the present invention, a barrier layer against oxygen and moisture can be made. It is to be appreciated that the presence of silane modified clay/polymer composites layer coated on the plastic substrate may substantially inhibit the permeation of gases and water vapor molecules to pass through the film. It is envisaged that silanes modified clay sheets that well intermix with polymer matrix form a hierarchical structure, which creates a longer tortuous path for molecules diffusion. The composites may also adsorb and retain part of the molecules on the surfaces, thus resulting in a reduced transmission rate of gas and water vapor molecules. Moreover, the laminated composites film is mechanically flexible to contour for multiple packaging applications due to the bending ability of the film.

It will be apparent that various other modifications and adaptations of the invention are available to the person skilled in the art after reading the foregoing disclosure without departing from the spirit and scope of the invention and it is intended that all such modifications and adaptations come within the scope of the appended claims.

What is claimed:

1. A polymeric coating suspension that comprises:
   a) 1.0 to 11.0 wt % of clay or silane modified clay,
   b) 0.1 to 10.0 wt % of poly (acrylic acid) copolymer, which is a copolymer of acrylic acid (AA) with at least one other monomer selected from 2-ethylhexyl acrylate (EHA), β-carboxyethyl acrylate (β-CEA), methacrylamidoethyl ethylene urea (WAM II) and ethoxylated behenyl methacrylate (β-EM),
   c) 1.0 to 15.0 wt % of other polymers and
   d) 70 to 97 wt % of water or mixture of water with 2-propanol.

2. The suspension according to claim 1, wherein poly (acrylic acid) is derived from a monomer mixture that comprises:
   a) 50 to 90 wt % of acrylic acid,
   b) 5 to 30 wt % of 2-ethylhexyl acrylate,
   c) 0.5 to 10 wt % of β-carboxyethyl acrylate,
   d) 0.5 to 10 wt % of methacrylamidoethyl ethylene urea,
   e) 0.5 to 10 wt % of ethoxylated behenyl methacrylate.

* * * * *